United States Patent
Kim et al.

(10) Patent No.: US 6,463,092 B1
(45) Date of Patent: Oct. 8, 2002

(54) SYSTEM AND METHOD FOR SENDING AND RECEIVING DATA SIGNALS OVER A CLOCK SIGNAL LINE

(75) Inventors: Gyudong Kim, Sunnyvale, CA (US); Min-Kyu Kim, Cupertino, CA (US); Seung Ho Hwang, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/393,235

(22) Filed: Sep. 9, 1999

Related U.S. Application Data
(60) Provisional application No. 60/099,770, filed on Sep. 10, 1998.

(51) Int. Cl.[7] .................................................. H04B 1/38
(52) U.S. Cl. ...................... 375/219; 375/220; 375/244; 375/257; 375/293; 375/354; 375/355; 375/360; 370/284; 370/301
(58) Field of Search ................................. 375/219, 220, 375/244, 257, 288, 293, 354, 355, 359, 360, 377; 370/284, 301, 307

(56) References Cited

U.S. PATENT DOCUMENTS
| | | | |
|---|---|---|---|
| 4,459,591 A | 7/1984 | Haubner et al. | 340/825.57 |
| 5,577,071 A | 11/1996 | Gehrke et al. | 375/259 |

FOREIGN PATENT DOCUMENTS
| | | | |
|---|---|---|---|
| EP | 0 798 901 A1 | 10/1997 | H04L/25/49 |
| FR | 2 251 139 | 6/1975 | H04L/5/14 |

OTHER PUBLICATIONS

"Phase Modulation I/O Interface Circuit"; Kazutaka Nogami et al.; IEEE International Solid–State Circuit Conference; vol. 37 Feb. 1994 (New York, US); 3 pages.

Loinaz, Marc J., Wooley, Bruce A., "A BiCMOS Time Interval Digitizer for High–Energy Physics Instrumentation", Center for Integrated Systems, Stanford University, IEEE 1993 Custom Integrated Circuits Conference, pp. 28.6.1–28.6.4.

*Primary Examiner*—Chi Pham
*Assistant Examiner*—Khanh Cong Tran
(74) *Attorney, Agent, or Firm*—Perkins Coie LLP; Paul Hickman; Steve S. Kelley

(57) ABSTRACT

The system preferably includes a unique transmitter that sends both clock and data signals over the same transmission line. The receiver uses the same transmission line to send data signals back to the transmitter. The transmitter comprises a clock generator, a decoder and a line interface. The clock generator produces a clock signal that includes a variable position falling edge. The falling edge position is decoded by the receiver to extract data from the clock signal. The receiver comprises a clock re-generator, a data decoder and a return channel encoder. The clock re-generator monitors the transmission line, receives signals, filters them and generates a clock signal at the receiver from the signal on the transmission line. The return channel encoder generates signals and asserts them on the transmission line. The signal is asserted or superimposed over the clock & data signal provided by the transmitter.

26 Claims, 17 Drawing Sheets

SYSTEM AND METHOD FOR SENDING AND RECEIVING DATA SIGNALS OVER A CLOCK SIGNAL LINE

This application claims benefit of provisional No. 60/099,770 filed Sep. 10, 1998.

CROSS-REFERENCES TO RELATED APPLICATIONS

This application is a utility conversion of U.S. Pat. No. 60/099,770, entitled "Embedded Back Channel For TMDS" by Gyudong Kim, filed Sep. 10, 1998.

BACKGROUND OF THE INVENTION

1. Field of the Invention

The present invention relates generally to the field of data communications, and more particularly, to the transmission of clock and data signals. Still more particularly, the present invention relates to the transmission of clock signals and data signals on the same transmission line in transition minimized differential signaling (TMDS) system.

2. Description of the Background Art

There are a variety of prior art systems and method for transmitting data between a transmitter and a receiver. Various serial links and other methods for transmitting data and clock signals are well known. However, most such schemes provide a single line or channel dedicated for the transmission of the clock signals and other signal lines or channels dedicated for the transmission of data. Once such system is described by Kyeongho Lee, Sungjoon Kim, Gijung Ahn, and Deog-kyoon Jeong in "A CMOS Serial Link For Fully Duplexed Data Communication," IEEE Journal of Solid State Circuits, Vol. 30, No. pp. 353–364, April 1995.

The present invention will be discussed in the context of transition minimized differential signaling (TMDS), however, those skilled in the art will recognize that the present invention is applicable in various other data communication contexts. In TMDS, four signal lines are provided, and each signal line is preferably a differential pair. One signal line is a for a low speed clock signal and the three other signal lines are for high-speed data transmission.

One important aspect of all data communication systems is to maximize the bandwidth provided by the data. channels. However, most systems include a variety of control signals that must be sent between the transmitter and the receiver to ensure proper operation, and maintain synchronization between the transmitter and the receiver. For example, it is not uncommon for as much as 20% of the bandwidth to be used for framing and synchronization in serial communication. One problem is that the bandwidth available for data is typically reduced because the data signal lines must be used to transmit these control signals between the transmitter and receiver. Yet another problem is latency in transmitting the control signals to the recipient. Especially in video data communication, much of the data must be transmitted in blocks during which control signals cannot be sent. For example, when transmitting data from a controller to a flat panel, the data is transmitted, and then there is a data enable period corresponding to the blanking period in CRT display that is used to send control and synchronization signal. Only during that data enable period can the control signals be sent under most protocols. Therefore, there is latency imposed on transmitting control signals to the receiver. Thus, there is need for a system that can provide for control signaling between the transmitter and the receiver without decreasing the available bandwidth for data transfer, and while reducing the latency in sending control signals.

Yet another problem in the prior art is that most systems do not provide a mechanism to get signals from the receiver back to the transmitter. In other words, there is not a return channel for communication. Some systems have provided additional signal lines, however, their addition and interface add significant complication, require re-wiring and create other problems that make the addition of a physical line unworkable. Another approach is to add a second transmitter, second receiver and signal lines. However, this essentially doubles the hardware requirements making such a solution too expensive. Furthermore, such duplication is overkill for the amount of data that needs to be sent between the transmitter and the receiver, especially when the application is one of sending video data from a transmitter to a receiver such as communication between a graphic controller and a video display device.

Therefore, there is a need for a system and method for that uses the clock signal line also for transmitting data signals between the transmitter and the receiver and vice-versa.

SUMMARY OF THE INVENTION

The present invention overcomes the deficiencies and limitations of the prior art with a unique data communication system. The system preferably includes a unique transmitter and receiver coupled by a transmission line. The transmitter sends both a clock signal and data signals over the transmission line to the receiver. The receiver uses the same transmission line to send data signals back to the transmitter.

The transmitter preferably comprises a clock generator, a decoder and a line interface. The clock generator produces a clock signal that includes a variable position falling edge. The falling edge position is decoded by the receiver to extract data in addition to the clock signal. The line interface couples the output of the clock generator to the transmission line. The line interface also couples the transmission line to the decoder and in doing so removes the signals from the clock generator. The decoder receives the signals from the line interface and decodes the signal to determine the data being sent from the receiver to the transmitter on the same line used to send the clock and data from the transmitter to the receiver.

The receiver preferably comprises a line interface, a clock re-generator, a data decoder and a return channel encoder. The clock re-generator, the data decoder and the return channel encoder are coupled to the transmission line by the line interface. The clock re-generator monitors the transmission line, receives signals, filters them and generates a clock signal at the receiver from the signal on the transmission line. The data decoder similarly is coupled to receive the signals on the transmission line, and filters and decodes the signals to produce data signals. This is preferably done by determining the position of the falling edge of the clock signal and translating the falling edge position into bit values. In contrast, the return channel encoder generates signals and asserts them on the transmission line. These signals are asserted or superimposed over the clock & data signals provided by the transmitter.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 1:
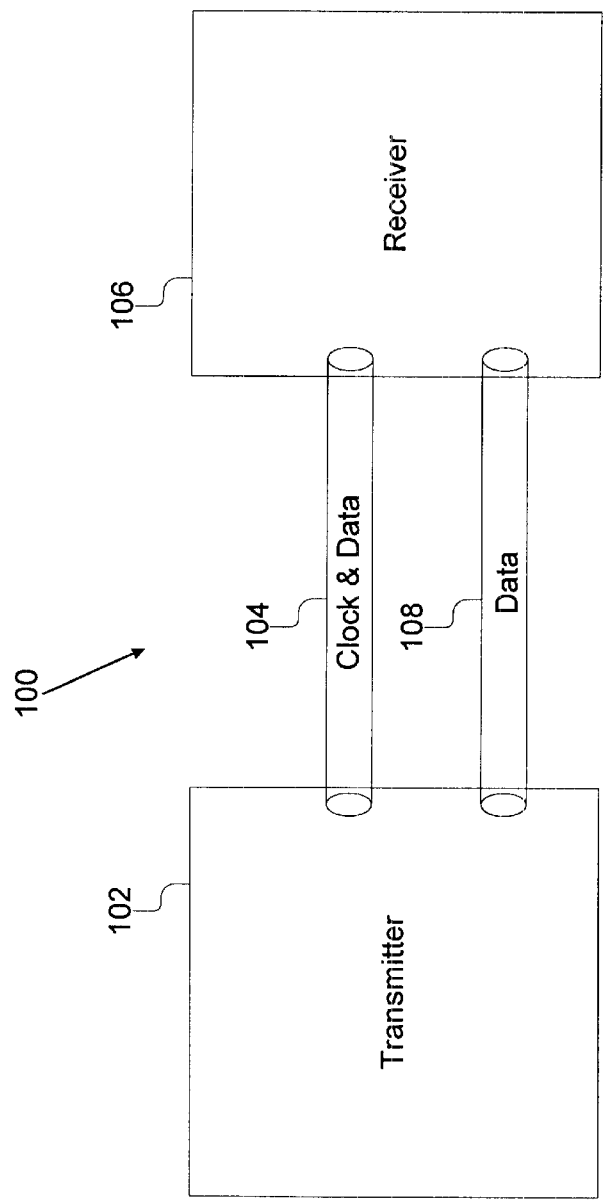
FIG. 1 is a block diagram of system including the combined clock and data signal line of the present invention.

Referring now to FIG. 1, a block diagram of system 100 including the combined clock and data signal line of the present invention is shown. The system 100 preferably includes a transmitter 102, a clock transmission line 104, a receiver 106 and one or more data transmission lines 108. The transmitter 102 preferably provides a clock signal as well as data signals to the receiver 106 via the clock transmission line 104. These data signals are in addition to those provided to the receiver 106 via the high speed data transmission lines 108. The receiver 106 receives the signals on the transmission line 104 and from them, generates the clock and data signals at the receiver 106. These data signals on the clock line 104 are again in addition to the data signals that the receiver 106 recovers from the data transmission line 108. The transmitter 102 and the receiver 106 include logic for sending and receiving the data from data transmission line 108. This logic preferably includes transition control, DC balancing, and encoding/decoding in a conventional manner. For example, in addition to the components of the present invention for receiving and sending data and clock signals on the clock transmission line 104 that will be described below, the transmitter 102 and the receiver 106 respectively include conventional data transmission logic for TMDS such as that provided in PanelLink by Silicon Image of Cupertino, Calif. For ease of understanding that logic and the data transmission line 108 are omitted from the discussion below and the remaining figures. Those skilled in the art will also realize that while shown as a single line, the clock transmission line 104 and the data transmission line 108 are preferably each a differential pair of signal lines, and the signal is carried on the differential pair of lines. Furthermore, those skilled in the art will understand the preferred embodiment for the data transmission line 108 is three pairs of data lines.

Transmitter

Figure 2:
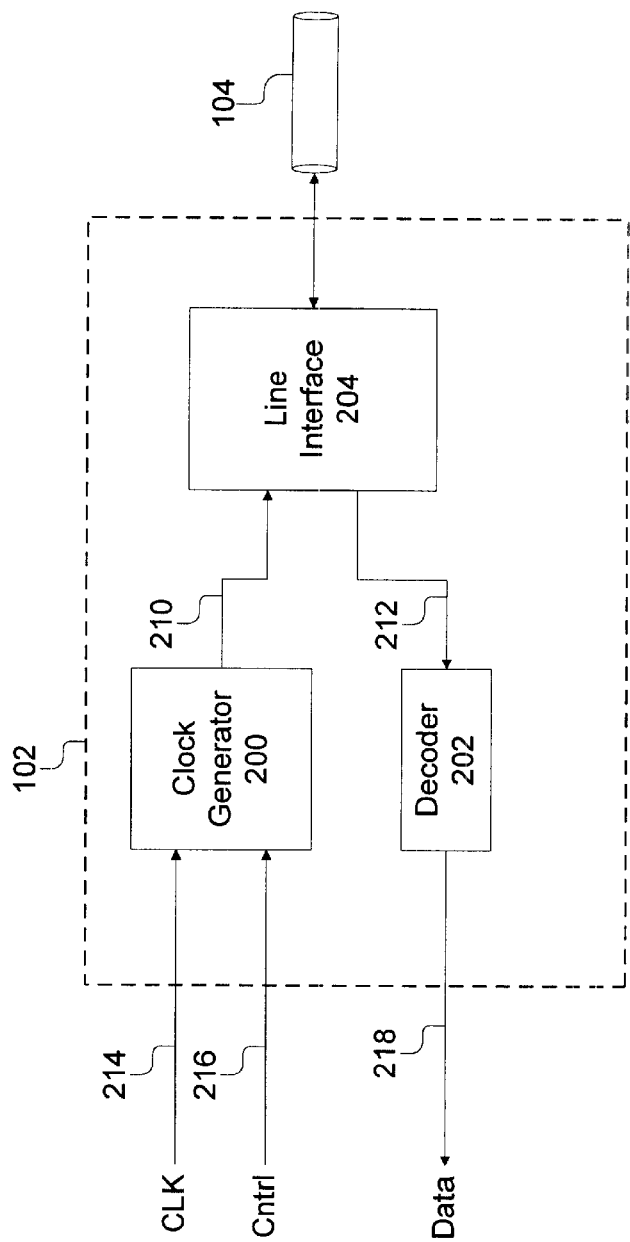
FIG. 2 is a block diagram of a portion of the transmitter showing a clock generator, decoder and a line interface.

Referring now to FIG. 2, a preferred embodiment of the transmitter 102 is shown in more detail. The transmitter 102 preferably comprises a clock generator 200, a line interface 204, and a decoder 202.

The clock generator 200 has a first input, a second input and an output. The clock generator 200 produces a clock signal that is encoded with data. The data is encoded into the clock signal by varying the modulation of the falling edge of the clock signal. In other words, the position of the falling edge of the clock relative to the rising edge indicates different data values. This is particularly advantageous because it preserves the rising edge of the clock for clock recovery. All the activity for a bi-directional data link on the clock transmission line 104 is centered around the falling edge of the clock from the transmitter 102. While most of the present invention will be described in the context of the falling edge of the clock having two different positions, FIG. 3 and will also be described in the context of the falling edge of the clock having five different positions. Each of the four positions representing two bit values and one position representing no data. The first input of the clock generator 200 is coupled to line 214 to receive a clock signal either from another portion of the transmitter 102 or from a oscillator or other conventional clock source. The second input of the clock generator 200 is coupled to line 216 to receive control/data signals. These control/data signals dictate the data or no data that is transmitted as part of the clock signal. These control/data signals may be from another portion of the transmitter 102 or from off chip control logic. The output of the clock generator 200 is provided on line 210 that is coupled to an input of the line interface 204. The output of the clock generator 200 provides a CGOut signal.

While the present invention is described throughout this application as preserving the rising edge for the clock signal and centering all the bi-directional data transmission about the falling edge, those skilled in the art will realize that an inverse scheme where the falling edge is preserved for recovering the clock and changes in position of the rising edge is used for encoding data is within the spirit and scope of the present invention.

The line interface 204 has an input, an output and a bi-directional port. The line interface 204 couples the clock generator 200 and the decoder 202 to the clock transmission line 104. The input of the line interface 204 preferably couples line 210 to the clock transmission line 104 so that the CGOut signal may be asserted over the clock transmission line 104. The output of the line interface 204 is coupled to the input of the decoder 202 by line 212. The line interface 204 advantageously receives the signal on the clock transmission line 104, removes the CGOut signal as will be described below with reference to FIGS. 5A and 5B, and sends the filtered signal as the input to the decoder 202. The bi-directional port of the line interface 204 is coupled to the clock transmission line 104..

The decoder 202 receives the filtered signals from the transmission line 104 and decodes the signals to generate the data sent by the receiver 106. The decoder 202 preferably performs an inverse function to the encoder 704 (See FIG. 7) of the receiver 106 as will be described below.

Figure 3:
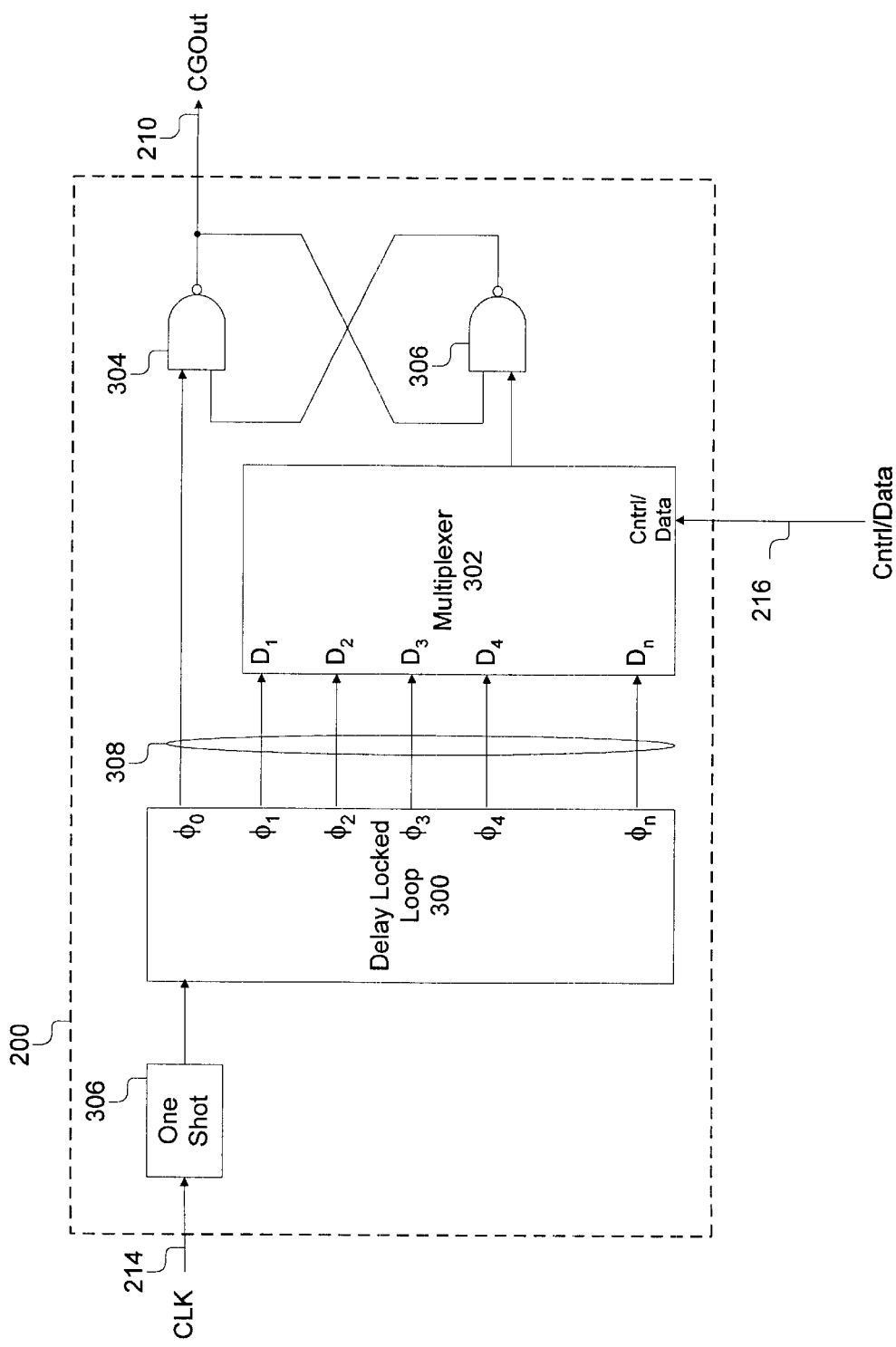
FIG. 3 is a block diagram of a preferred embodiment of the clock generator constructed in accordance with the present invention.
Figure 4:
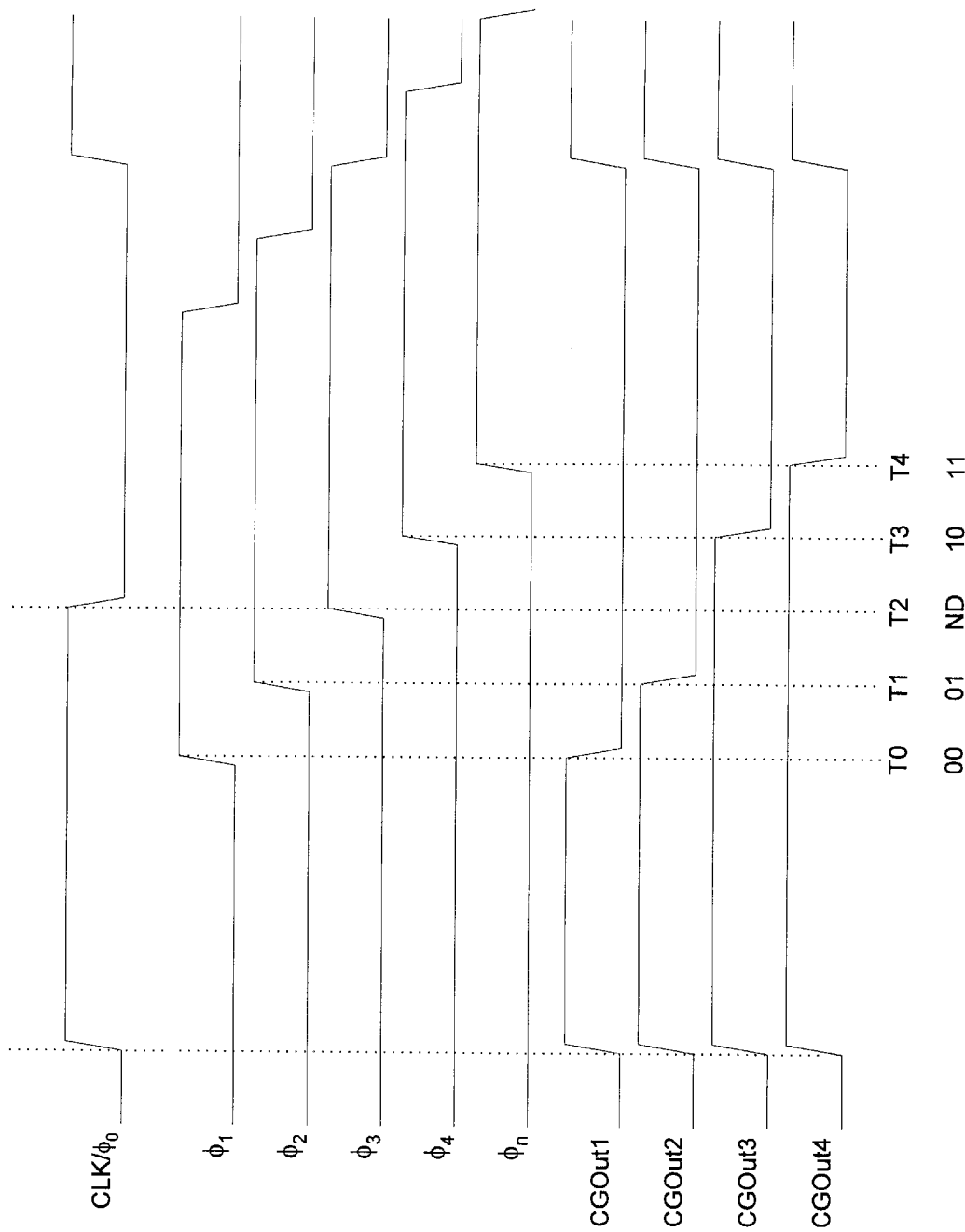
FIG. 4 is a timing diagram illustrating various clock signals that the clock generator of the present invention produces.

Referring now to FIGS. 3 and 4, the preferred embodiment for the clock generator 200 will be described. While the clock generator 200 will now be described as providing a clock signal having a falling edge in five possible locations to send two bits of data or no data in addition to the clock signal, those skilled in the art will recognize that this is only by way of example. The clock generator 200 could be configured to send from 1 to n bits of data per clock cycle depending on the clock frequency and the number of possible locations for the falling edge of the clock signal. In general, n locations of the falling edge will allow up to $\log_2 n$ bits of data to be transferred per clock cycle. The number of locations for the falling edge is limited only in that the first location must be such that the pulse width is greater than the logic-threshold crossing time of the rising edge, which may be viewed to be jitter by the phase-locked loop at the receiver 106. In other words, the thresholds for set up and hold time in the logic must be sufficient to recognize a rising edge as the beginning of the clock cycle.

The clock generator 200 preferably generates a clock signal at the dot clock frequency, or the frequency used by device (not shown) connected to the receiver 106 for the display of the data. The maximum symbol rate provided by data transfer as part of the clock signal matches the dot clock frequency. For example, if the dot clock is 100 MHz, the symbol rate is 100 Msymbols/s. The actual data rate will depend on the modulation methods and the number of bits per clock or symbol that can be sent. If simple binary modulation is used, then the bit rate is the same and the clock rate with would provide an additional 100 Mb/s for control signals.

The clock generator 200 preferably comprises a monostable multivibrator 306, a delay-locked loop 300, a multiplexer 302, a first NAND gate 304 and a second NAND gate 306. The clock generator 200 preferably uses only return to zero signaling for sending the clock and data signals. Non-return to zero signaling cannot be used for sending from the transmitter 102. The clock signal is received on line 214 and provided as input to the input of the one shot or monostable multivibrator 306. The monostable multivibrator 306 is provided to generate a signal with a narrower pulse width than the clock signal. This is advantageous for use in other portions of the clock generator 200. In an alternative embodiment, the one shot 306, may be replaced by a plurality of monostable multivibrators each respectively coupled in series with an output signal line 308 of the delay locked loop 300. Such an alternate embodiment provides more flexibility in the design of the delay locked loop 300 at the cost of additional monostable multivibrators will be understood by those skilled in the art. The output of the monostable multivibrator 306 is coupled to the input of the delay-locked loop 300. The delay-locked loop 300 is of a conventional type and in response to a signal at its input, provides a plurality of outputs, each output being the same as the input only shifted in phase. The falling edge is modulated using a delay-locked loop 300. The falling edge is chosen from one of the phases provided by the delay-locked loop 300. It is preferable that the selected phases from the delay-locked loop 300 be the ones close to a 50% duty cycle. The delay-locked loop 300 preferably provides five output signals: φ0, φ1, φ2, φ3, φ4, and φn. The φ0 signal is the clock signal unchanged. The φ1, φ2, φ3, φ4, and φn are each phase shifted more with respect to the previous φ signal. The φ0 is coupled to a first input of the first NAND gate 304. The output of the first NAND gate 304 is provided on line 210 and provides the CGOut signal. The first NAND gate 304 is cross coupled with the second NAND gate 306 to form a set-reset latch. A rising edge on the φ0 causes the output of first NAND gate 304 to be set high or asserted until reset to low by the second NAND gate 306. The remaining signals from the delay-locked loop 300, φ1, φ2, φ3, φ4, and φn are coupled to respective data inputs of the multiplexer 302. The control input of the multiplexer 302 is coupled to line 216 to receive control/data signals. In response to the control/data signals on line 216, the multiplexer 302 will couple one of the signals from the delay-locked loop 300, φ1, φ2, φ3, φ4, and φn, to the input of the second NAND gate 306. Thus, the rising edge on the selected signal from the delay-locked loop 300, φ1, φ2, φ3, φ4, and φn, will cause the latch to be reset and create a falling edge on the output of the first NAND gate 304, and thus, line 210. Thus, it is apparent that using the control/data signals to select one of the signals, the position of the falling edge can be selected. For example control signals such as shown in Table I may be used to control the position of the falling edge.

TABLE I

| Control/data Signal (216) | NAND-gate 306 input | Falling edge Position | Data Sent |
| --- | --- | --- | --- |
| 000 | φ1 | T0 | 00 |
| 001 | φ2 | T1 | 01 |
| 100 | φ3 | T2 | 00 |
| 010 | φ4 | T3 | 10 |
| 011 | φn | T4 | 11 |

Those skilled in the art will recognize how the clock generator 200 could be modified to create any number of different falling edge positions for the CGOut signal. Referring also to FIG. 4, a timing diagram of the clock/φ0, φ1, φ2, φ3, φ4, and φn and the possible CGOut signals are shown. There are five possible CGOut signals. First, the clock/φ0 signal is unchanged which is just the input signal with falling edge at time T2 and sending no data. The remaining CGOut1–CGOut4 signals are have a falling edge with an adjusted position to times T0, T1, T3, T4 respectively each representing a different two bit value. Thus, the preferred embodiment is able to transfer two bits per clock from the transmitter 102 to the receiver 106 in addition to the clock signal. Since the receiver 106 uses only the rising edge to detect and define clock cycles, the present invention uses this to achieve the data transfer without any performance disadvantages. For the receiver 106 embodiments described below where only one bit of data per clock is sent, the clock generator 200 would output falling edges at times T1 and T3.

The ability of the present invention to use the clock transmission line 104 to send data from the transmitter 102 to the receiver 104 is particularly advantageous because it eliminates signal latency present in the prior art. With the present invention as applied to TMDS, the transmitter 102 does not need to wait for the next available data enable (DE)

low period to send the signals. This greatly decreases the maximum transfer latency. Moreover, the present invention can be used in other serial links that require very short latency. For example, if a fixed bit location is assigned for each link (a fixed bandwidth per fixed dot clock) the synchronization overhead for those channels can be minimized. In this way, the latency of such links can be reduced to 1 frame cycle and the cable flight time. The other bits of the payload can be used with variable bandwidth but the synchronization latency or delay could be longer.

Yet another advantage of the forward channel for sending data from the transmitter 102 to the receiver 106 is that it is fully backward compatible with prior TMDS designs and protocols. Thus, whether the receiver 106 is able to receive data from the transmitter 102 or not, the clock signal is unaffected by the addition of data to the signal. Moreover, a receiver 106 will not have a problem recovering the clock even if data (for either the transmitter 102 or the receiver 106) is added in accordance with the present invention to the signal on the transmission line 104. Therefore, the transmitter 102 of the present invention can still be used even if the receiver does not have the capability to receive the data signal.

Figure 5A:
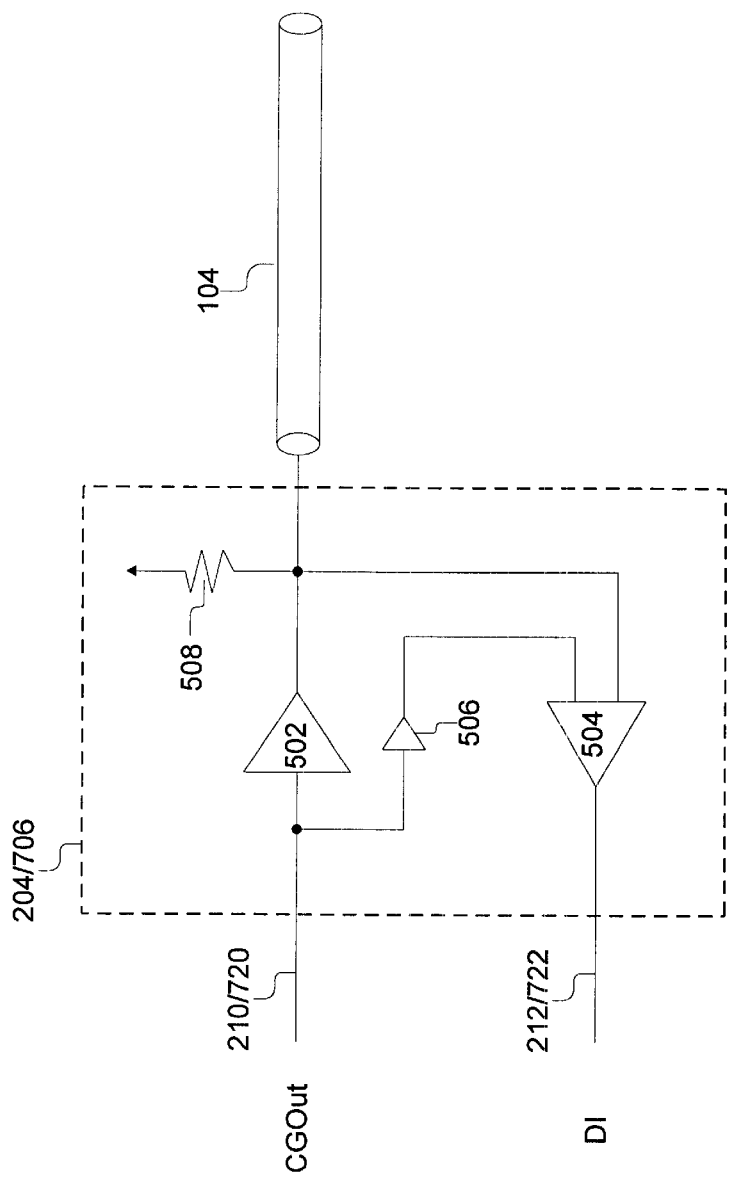
FIG. 5A is a block diagram of a preferred embodiment of the line interface constructed in accordance with the present invention.
Figure 5B:
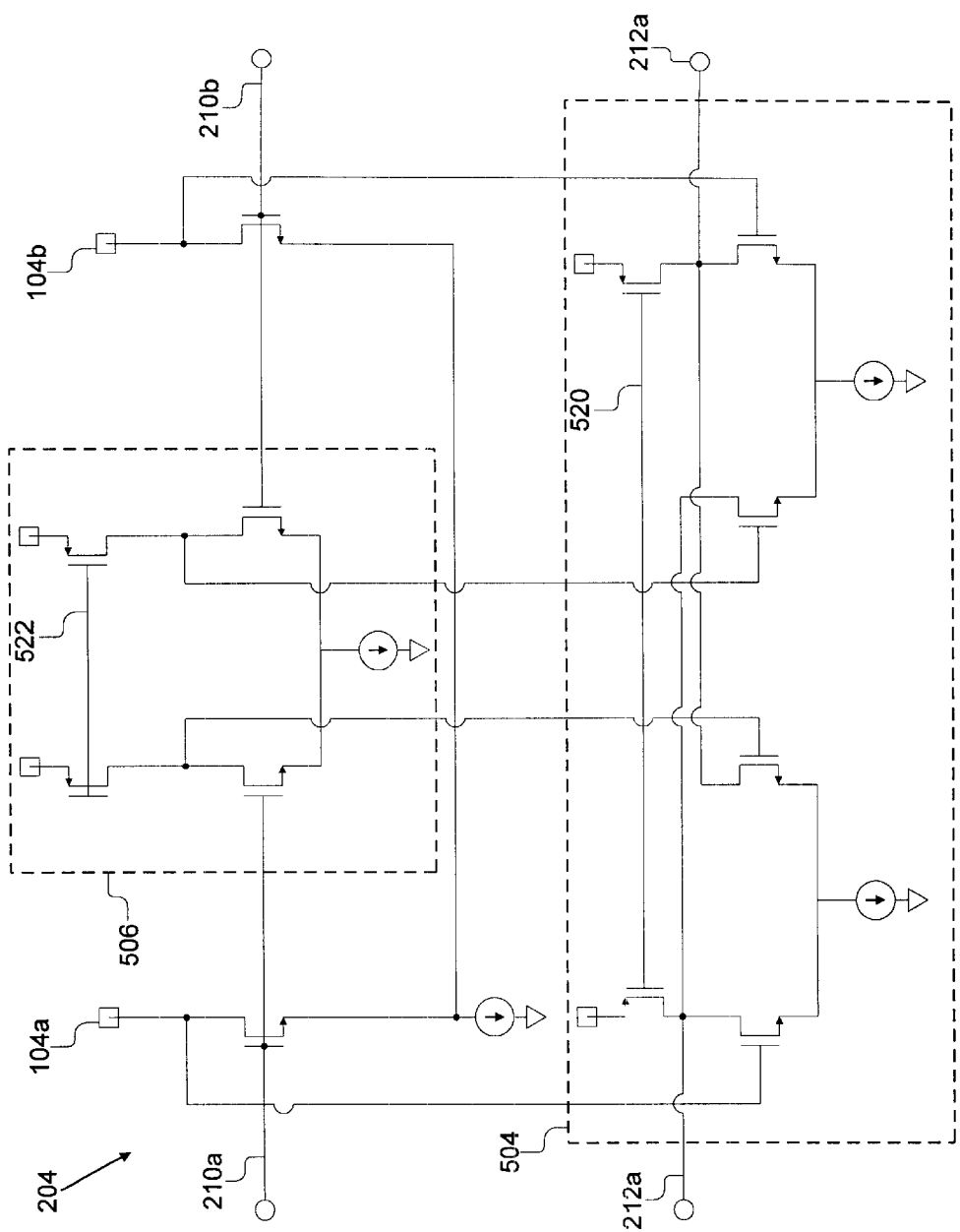
FIG. 5B is a circuit diagram of the preferred embodiment of the line interface constructed in accordance with the present invention.

Referring now to FIGS. 5A and 5B, the preferred embodiment for the line interface 204 is shown. The line interface preferably comprises a first amplifier 502, a second amplifier 506, a differential amplifier 504 and a line terminator or pull-up resistor 508. The line interface 204 is essentially a bi-directional bridge that allows transmission of data while receiving data from the receiver 106. The input of the first amplifier 502 is coupled to line 210 to receive the CGOut signal. The input of the second amplifier 506 is similarly coupled. The output of the first amplifier 502 is coupled to apply an amplified version of the CGOut signal to clock transmission line 104. The clock transmission line 104 is also coupled by the pull-up resistor 508 to high voltage to form a line terminator. The pull-up resistor 508 could instead be coupled to ground or half $V_{DD}$ as will be understood to those skilled in the art for alternate embodiments of the line terminator. The clock transmission line 104 is also coupled an input of the differential amplifier 504. The other input of the differential amplifier 504 is coupled to the output of the second amplifier 506. The second amplifier 506 also receives the CGOut signal and amplifies the signal, but to the same or lesser extent than the first amplifier 502. The differential amplifier 504 subtracts the CGOut signal from the signal received from the clock transmission line 104. Thus, the output of the differential amplifier 504 that is provided on line 212 includes predominately the signals asserted by the receiver 106 on the clock transmission line 104 and not the CGOut signal. It should be noted that an identical circuit with inputs and output coupled differently may also be used in the receiver 106 as will be described below with reference to FIG. 7.

Referring also now to FIG. 5B, a circuit diagram for one exemplary embodiment for the line interface 204 is shown. The connections to the signal lines 210 and 104 are shown with reference numerals for clarity and ease of understanding. The signals preferably use differential pairs are indicated by reference numerals "a" and "b" as will be understood to those skilled in the art. The transistors and other components forming the second amplifier 506 and the differential amplifier 504 are shown grouped within dashed boxes as will be understood to those skilled in the art. The remaining transistors and other components from the first amplifier (not labeled in FIG. 5B). It should be noted that some of the transistors in the second amplifier 506 are for impedance matching, and have their gates coupled to signal line 522 to be biased for impedance matching in a conventional manner. Some of the transistors in the differential amplifier 504 are also coupled to line 520 for biasing. In alternate embodiments, the outputs of the differential amplifier 504 could be coupled to line 520 and thereby provide a single output signal as will be realized by those skilled in the art. Those skilled in the art will further recognize that in alternative embodiments, various other conventional bi-directional buffers could be used in place of the circuits shown in FIGS. 5A and 5B.

Figure 6A:
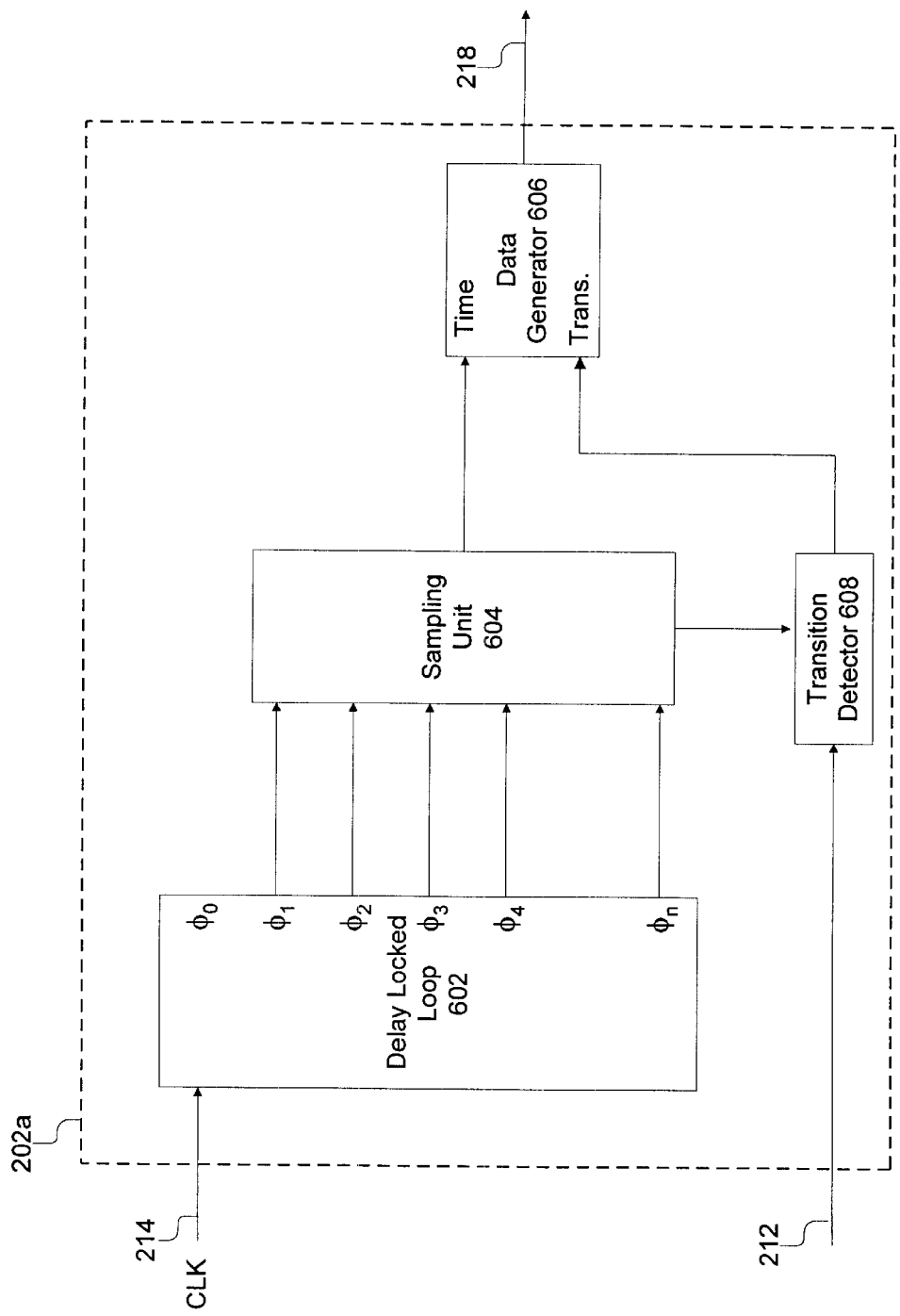
FIG. 6A is a block diagram of a first embodiment of the decoder at the transmitter constructed in accordance with the present invention.
Figure 6B:
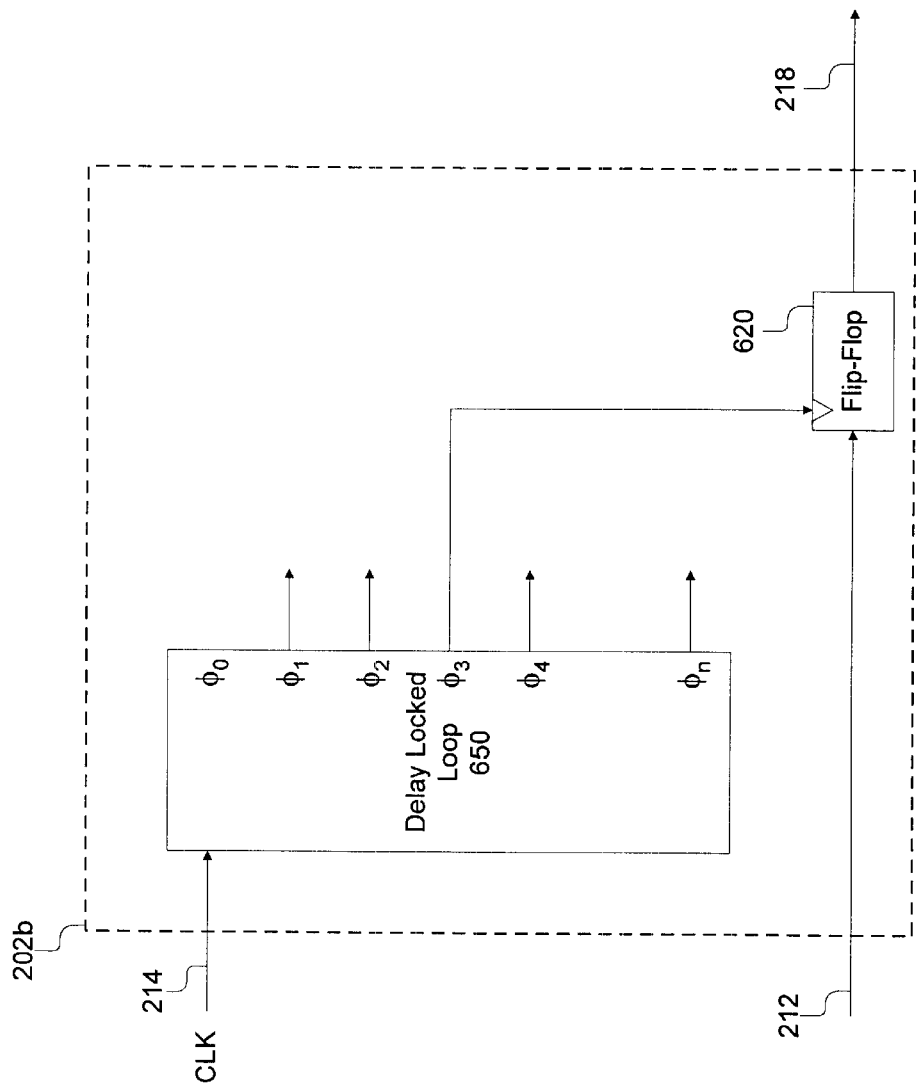
FIG. 6B is a block diagram of a second embodiment of the decoder at the transmitter constructed in accordance with the present invention.

Referring now to FIGS. 6A and 6B, two alternate embodiments for the decoder 202 are shown. The embodiment for the decoder 202 is dependent on the type of signaling being used by the corresponding encoder 704 (See FIG. 7 and below) in the receiver 106. FIG. 6A shows. a block diagram of the first embodiment of the decoder 202a at the transmitter 106 for use when the receiver 106 sends the data in a non-return to zero (NRZ) signaling. As shown in FIG. 6A, when the receiver 106 sends data in NRZ (non-return to zero) manner and toggles data at the fictitious falling edge (since the clock toggles its falling edge randomly in accordance with the present invention), since the delay is a function of cable delay, at the transmitter side, it is not predictable where the relative location of the data transition will be, even though it may have been obvious at the receiver side. Because of this ambiguous delay, the decoder 202a oversamples the data provided from the clock transmission line 104/212. Since the incoming data rate is the same as outgoing data rate, the present invention generates multiple phases of clocks from the clock signal on line 214. Using these clocks, the signal line 212 is sampled multiple times per data period to locate a data transition. Once the transition is detected, it is used as the data boundary.

As shown in FIG. 6A, the first embodiment of the decoder 202a preferably comprises a delay-locked loop 602, a sampling unit 604, a data generator and a transition detector 608. The delay-locked loop 602 has an input coupled to receive the clock signal on line 214. The same delay-locked loop could be used in both the clock generator 200 and the decoder 202. The delay-locked loop 602 is of a conventional type and provides a plurality of phase shift clock signals. Outputs of the delay-locked loop 602 are coupled to respective inputs of the, sampling unit 604. The sampling unit 604 includes control logic for generating a signal on a first output that controls when the transition detector 608 samples and latches the signal on line 212. For example, the sampling unit 604 can generate this control signal for every rising edge seen at the input from the delay-locked loop 602. The first output is coupled to an input of the transition detector 608. The sampling unit 604 also provides a time signal on a second output indicating the signals from the delay-locked loop 602 that have transitioned, and thus, the time within the clock cycle. The second output of the sampling detector 604 is coupled to an input of the data generator 606. The transition detector 608 has an input coupled to line 212 to receive the signal from the receiver 106. The transition detector 608 detects transitions in the signals on the line 212. When a transition is present the transition detector 608 asserts its output. The data generator 606 is coupled to the sampling unit 604 to receive a signal indicating the time within the clock cycle and the transition detector 608 to identify when the transition occurs. Using this information, the data generator 606 outputs the bit values corresponding to when the transitions occur. For example if the transition is before the time for a falling edge of the clock if it had a 50% duty cycle then the data generator 606 may output a 1 if after the data generator 606 could output a 0 if the data rate were one bit per clock cycle. Those skilled in the art will recognize how the data generator 606 could be modified according to the number of bits per clock cycle transmitted by the receiver 106. The output of the data generator 606 is provided on line 218 for use by the transmitter 102.

FIG. 6B shows an alternate embodiment for the decoder 202a. When receiver 106 sends data in return to zero (RZ) manner, the rising edge of the incoming clock is preferably used as the data reference point, and a phase in the middle of those consecutive rising edges is generated and used to sample the incoming data at that point. Thus, the decoder 202a comprises merely a delay-locked loop 650 and a flip-flop 620. The delay-locked loop 650 preferably provides a signal that has a rising edge in about the middle of the clock cycle such as φ3. This signal is coupled to the clock input of the flip-flop 620 to cause the flip-flop 620 to latch near the middle of the clock cycle. The data input of the flip-flop 620 is coupled to line 212 to receive the data signal sent by the receiver 106 and the D output of the flip-flop 620 provides the data output and is coupled to line 218.

Those skilled in the art will recognize that the decoder 202 may alternatively be formed as an integrator type receiver where the period of the clock is subdivided and the integrator integrates over the subdivided time periods and compares the integration results. The signal is effectively integrated and dumped for comparison to determine the data values.

Receiver

Figure 7:
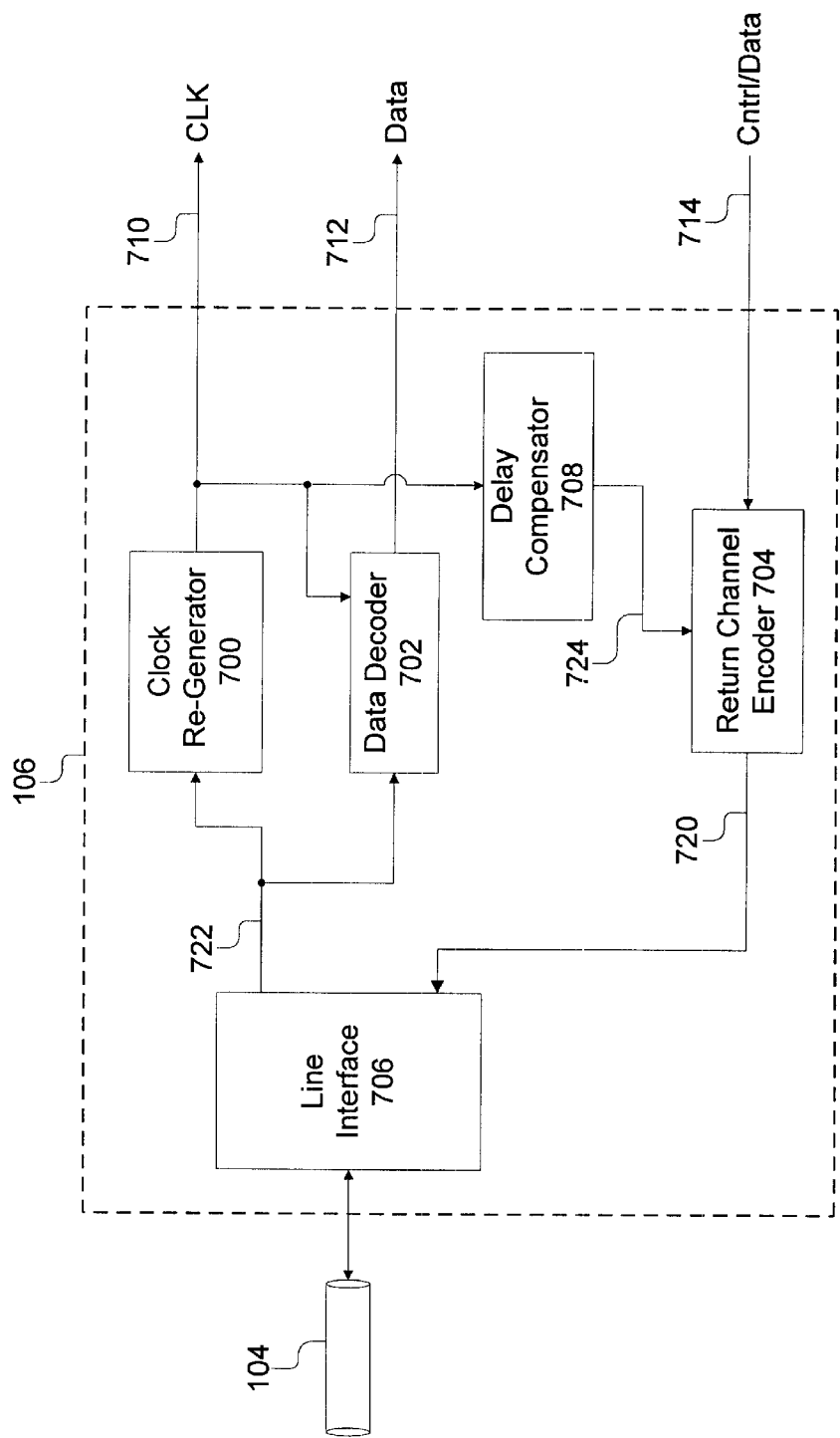
FIG. 7 is a block diagram of a first embodiment of portions of the receiver relating to the present invention.

FIG. 7 shows a preferred embodiment for the receiver 106 constructed in accordance with the present invention. The receiver 106 preferably comprises a line interface 706, a clock re-generator 700, a data decoder 702, a delay compensator 708 and a return channel encoder 704.

The line interface 706 is preferably identical to that described above with reference to FIGS. 5A and 5B. However, for the receiver 106, the line interface 706 is completely optional and the receiver 106 can operate without it. The line interface 706 buffers the signals and filters them for better use in recovery. The line interface 706 has an input, an output and a bi-directional port. The bi-directional port is coupled to the clock transmission line 104. The input of the line interface 706 is coupled to line 720 to receive the output of the return channel encoder 704. The output of the line interface 706 is coupled to line 722 to provide input signals to the clock re-generator 700 and the data decoder 702. For ease of understanding reference numerals for the line interface 706 have been added to FIG. 5A.

Figure 8:
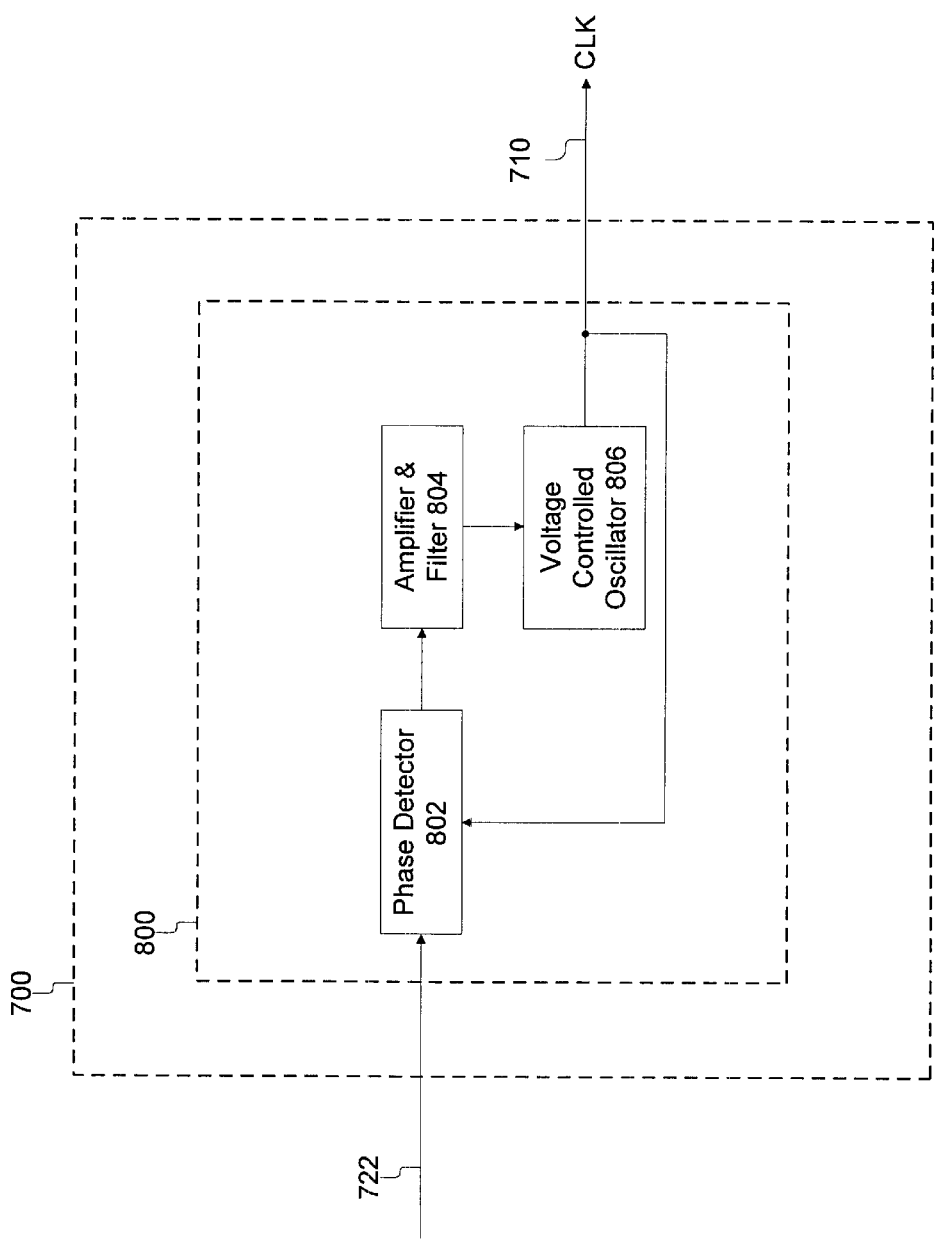
FIG. 8 is a block diagram of a first embodiment of a clock re-generator of the receiver.

The clock re-generator 7.00 has an input and an output. The input of the clock re-generator 700 is coupled to receive the signals on the clock transmission line 104 via line 722 from the line interface 706. The clock re-generator 700 monitors the transmission line 104, receives signals, filters them and generates a clock signal at the receiver 106. The output of the clock re-generator 700 is coupled to line 710 and provides the clock signal for the receiver 106 to use in recovering data from the data channels 108. The clock re-generator 700 advantageously only uses the rising edges of the signals on the transmission line 104 to regenerate the clock signal at the receiver 106. This allows the falling edge position and voltage level to be used for other data transfer. The preferred embodiment for the clock re-generator 700 is simply an amplifier that can provide an amplified version of the signal to other digital logic receiving the clock. Referring now also to FIG. 8, another embodiment for the clock re-generator 700 is shown. In FIG. 8, the clock re-generator 700 is a phase-locked loop 800 that has an input that is coupled to the transmission line 104 and an output that provides the clock as a square wave. The phase-locked loop 800 is a conventional type and includes a phase detector 802, an amplifier and filter 804 and a voltage controlled oscillator 806. These components 802, 804, 806 are coupled in a conventional manner with the input of the phase detector 802 coupled to line 104 and the output of the voltage controlled oscillator providing the clock signal and being feed back to the phase detector 802. Those skilled in the art will recognize that various other embodiments of phase-locked loops could be used for the clock re-generator 700 since it is only necessary to detect the rising edges on the transmission line 104 and produce a clock signal therefrom. Alternate embodiments for the clock re-generator 700 could also use a delay-locked loop.

Figure 9:
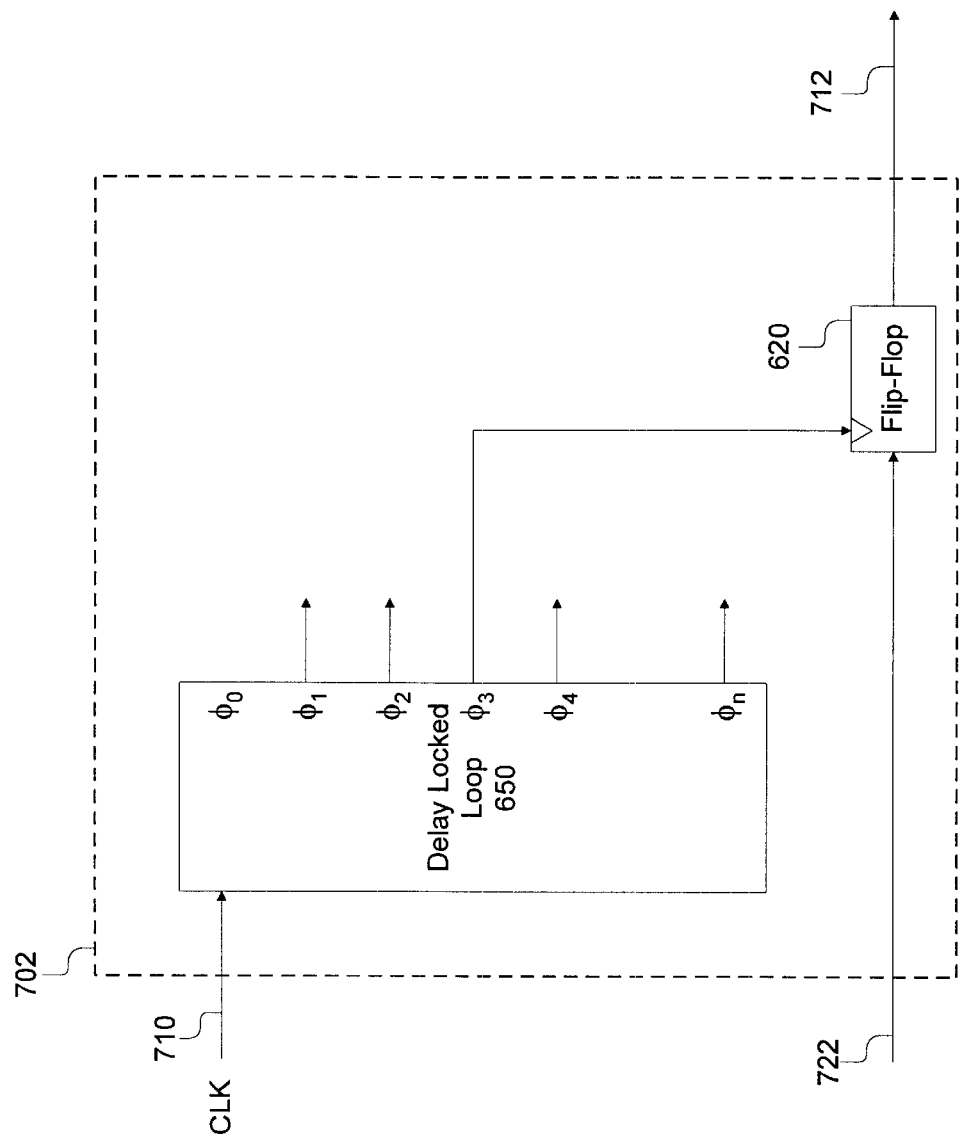
FIG. 9 is a block diagram of a preferred embodiment of a data decoder of the receiver.

The data decoder 702, like the clock re-generator 700, has an input coupled to receive the signals on the transmission line 104 via line 722 from the line interface 706. The data decoder 702 filters and decodes the signals to produce data signals that are output on line 712. The data decoder 702 also has another input coupled to line 710 to receive the recovered clock signal from the clock re-generator 700. This is preferably done by determining the position of the falling edge of the clock signal and translating the falling edge position into bit values. The data being sent from the transmitter 102 to the receiver 106 is valid on the falling edge of the clock. Referring also now to FIG. 9, a preferred embodiment for the data decoder 702 will be discussed. The preferred embodiment of the data decoder 702 is very similar to the second embodiment of the decoder 202b of the transmitter 102. The data decoder 702 differs only in its coupling to other components which is shown in FIG. 9. The data decoder 702 includes a delay-locked loop 650 and a flip-flop 620. The clock input of the delay-locked loop 650 is coupled to line 710 to receive the regenerated clock signal. The data input to the flip-flop 620 is coupled to line 722 to receive the filter data signals from the transmission line 104. The output of the flip-flop 620 provides the data output and is coupled to line 712. The operation is the same as has been described above with reference to FIG. 6B.

The delay compensator 708 is coupled to line 710 to receive the recovered clock signal. The delay compensator 708 adjusts the recovered clock signal to compensate for propagation delay over the transmission line 104 and propagation delay in recovering the clock such that the signal used to time the sending of data back to the transmitter 102 will have timing that matches the original clock signal on the transmitter side of the clock transmission line 104. The output of the delay compensator 708 provides an adjusted clock signal and is used by the return channel encoder 704. In a preferred embodiment, the delay compensator 708 is a phase-locked loop with a delay circuit in the feedback loop between the voltage-controlled oscillator and the phase detector, as will be understood to those skilled in the art. Such a configuration provides negative delay so that the clock signal for return channel signals is moved ahead so that with propagation delay it will matches the timing of the CGOut signal at the transmitter 102.

The return channel encoder 704 generates signals and asserts them on the transmission line 104 via line 720 and the line interface 706. The return channel encoder 704 has a data input coupled to line 714 to receive the control and data signals for the data to be sent on the return channel. The return channel encoder 704 also has a clock input coupled by line 724 to the output of the delay compensator 708 to receive a modified clock signal for timing the assertion of data and change in data states. These signals are asserted or superimposed over the clock & data signals provided by the transmitter 102. The return channel encoder 704 advantageously sends data back to the transmitter 106 on the falling edge of the clock thereby preventing the return channel 704 from causing any jitter on the clock signal. More specifically, the return channel encoder 704 minimizes transition activity only around the rising edge of the clock, and minimizes activity by fixing the polarity around the rising edge. This is accomplished by including a delay-locked loop in the return channel encoder 704. The return channel encoder 704 advantageously places data on the transmission line 104 or clock pair in the form of voltage signal and not edge position, thus reducing any interference and effect on the transmission of the clock and data signals by the transmitter 102.

Figure 10A:
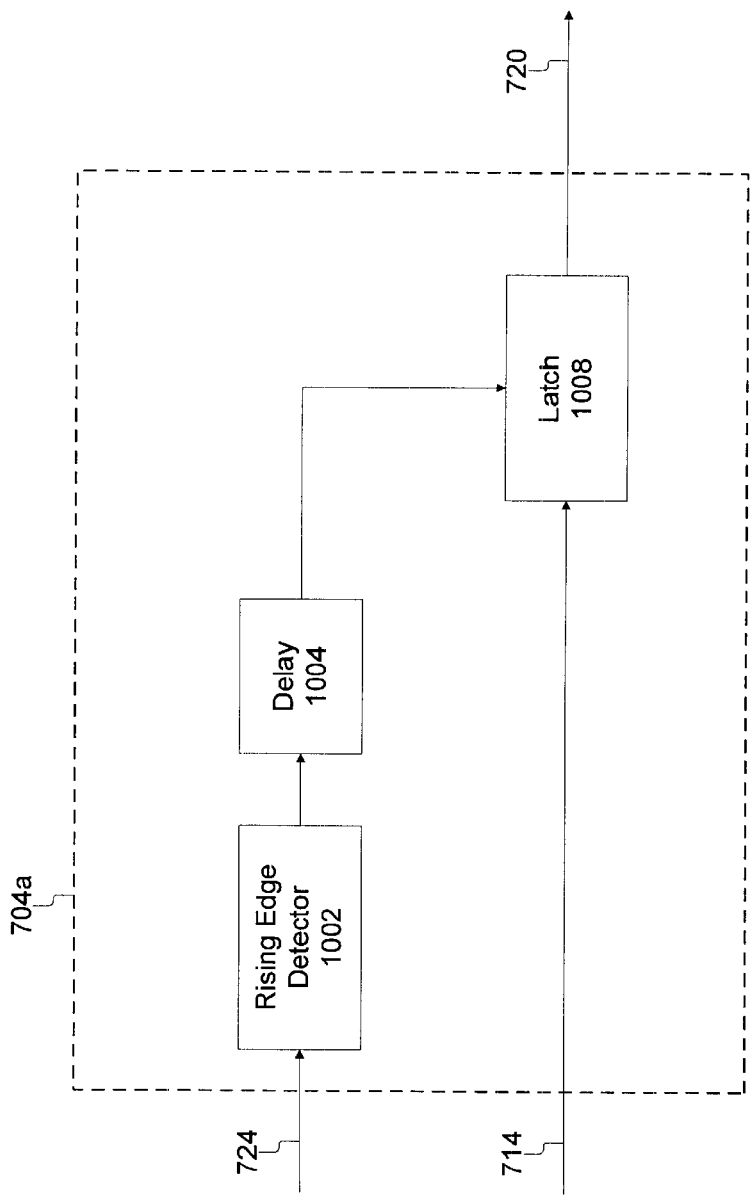
FIG. 10A is a block diagram of a first embodiment of a return channel encoder of. the receiver.

Referring now to FIG. 10A, a first embodiment of the return channel encoder 704a is shown. The first embodiment return channel encoder 704a provides the minimum functionality for transmission. For example, the return channel encoder 704a could be a 1-bit link. This has a low data rate and does not allow DC balancing, however it is advantageous because there is no latency (once the data is at the transmitter there is no latency due to decoding) in getting the data and it is simple to implement. The first embodiment of the return channel encoder 704a includes a rising edge detector 1002, a delay circuit 1004 and a latch 1008. The rising edge detector 1002 has an input coupled to line 724 to receive a signal for timing the changing of the data output. The rising edge detector 1002 detects the rising edge and then asserts its output upon receiving rising edge. The output of the rising edge detector 1002 is coupled to the input of a delay circuit 1004. The delay circuit delays the signal output of the rising edge detector 1002, such as by half the clock period. Thus, the output of the delay circuit 1004 is at a time of an ideal falling edge if the clock were to have a 50% duty cycle. The output of the delay circuit 1004 is used to control or latch the latch 1008. Thus, the data will only change state on an ideal falling edge of the input timing signal on line 724. The latch 1008 also has a data input and a data output. The data input is coupled to line 714 to receive the data, and the data output is coupled to line 720 for assertion by the line interface 706. Those skilled in the art will understand how to construct other return channel encoders such as when more that one bit is send back to the transmitter 102 per clock cycle.

Figure 10B:
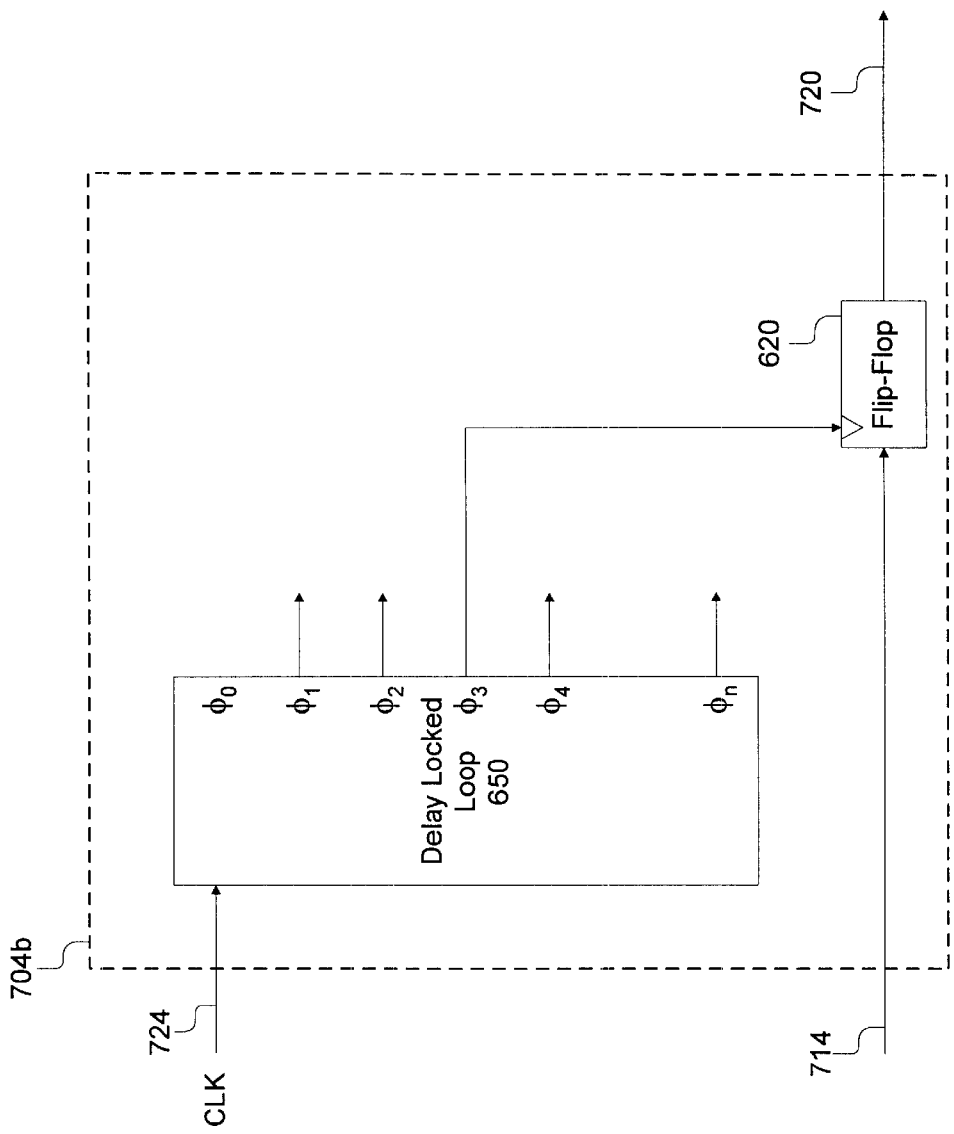
FIG. 10B is a block diagram of a second and alternate embodiment of a return channel encoder of the receiver.

Furthermore, those skilled in the art will realize that the rising edge detector 1002 and the delay circuit 1004 may be replaced by a delay-locked loop or a phase-locked loop as will now be discussed with reference to FIG. 10B. Referring now to FIG. 10B, a second embodiment of the return channel encoder 704b is shown. The second embodiment of the return channel encoder 704b includes a delayed locked loop 650 and a flip-flop 620. This is identical in operation to FIG. 6B, and it operation has been described above. The input to the delayed locked loop 650 is coupled to line 724 and the data input of the flip-flop 620 is coupled to line 714. The data output of the flip-flop 620 provides the data output on line 720.

It should be understood that the either embodiment of the return channel encoder 704a, 704b could also include an encoder for providing encoding of the data before transmission over the return channel. The addition of an encoder such as 4 bit/5 bit encoder or a 9 bit/10 bit encoder is advantageous because it increases the amount of data that can be sent per clock cycle. It also provides DC balancing and transition control. However, it makes the transmitter and receiver designs more complicated and adds latency to the availability of the data.

Figure 11A:
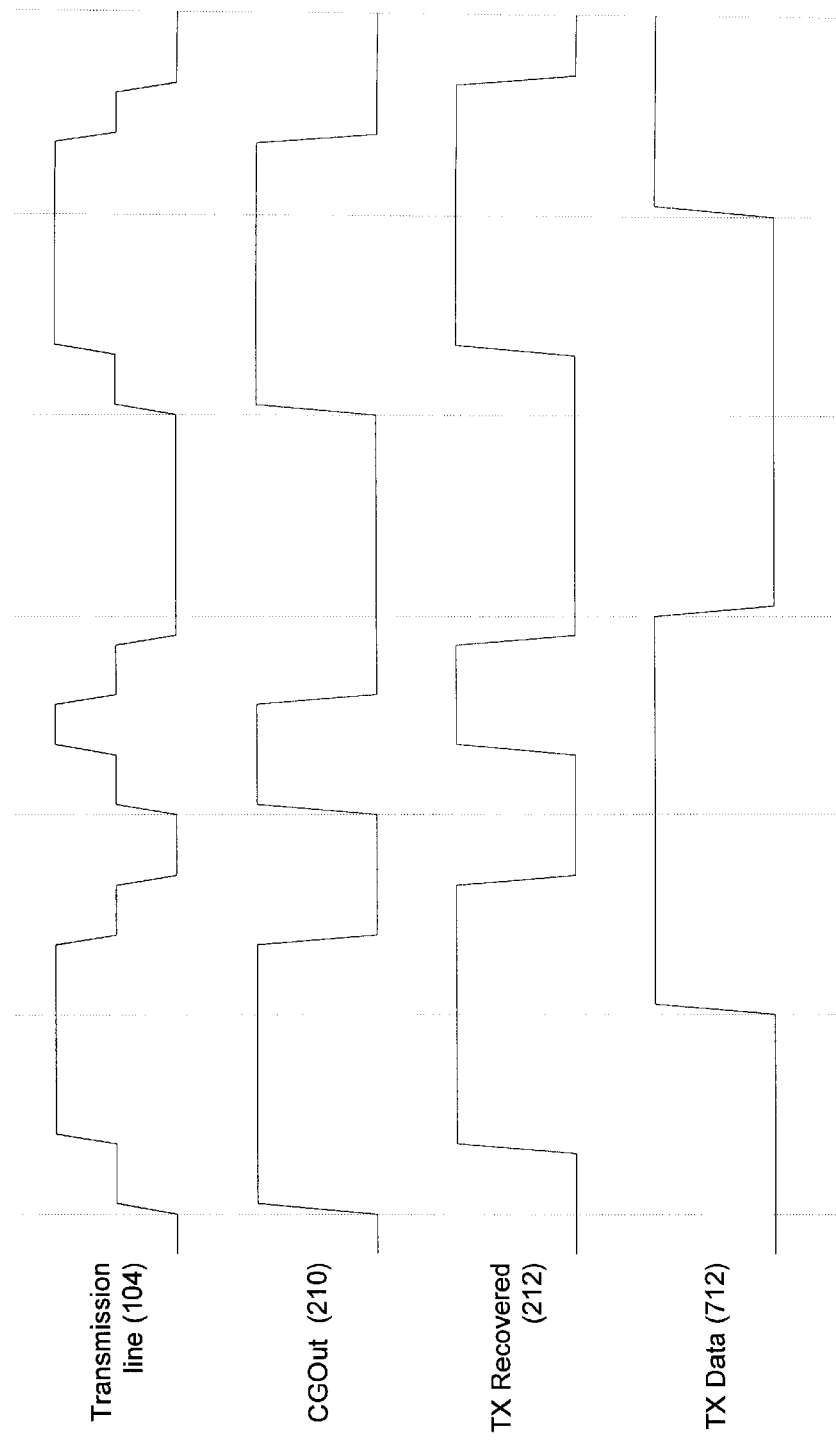
FIG. 11A is a timing diagram illustrating signals on the transmission line, and the clock and data signals generated by the transmitter for return to zero signaling.
Figure 11B:
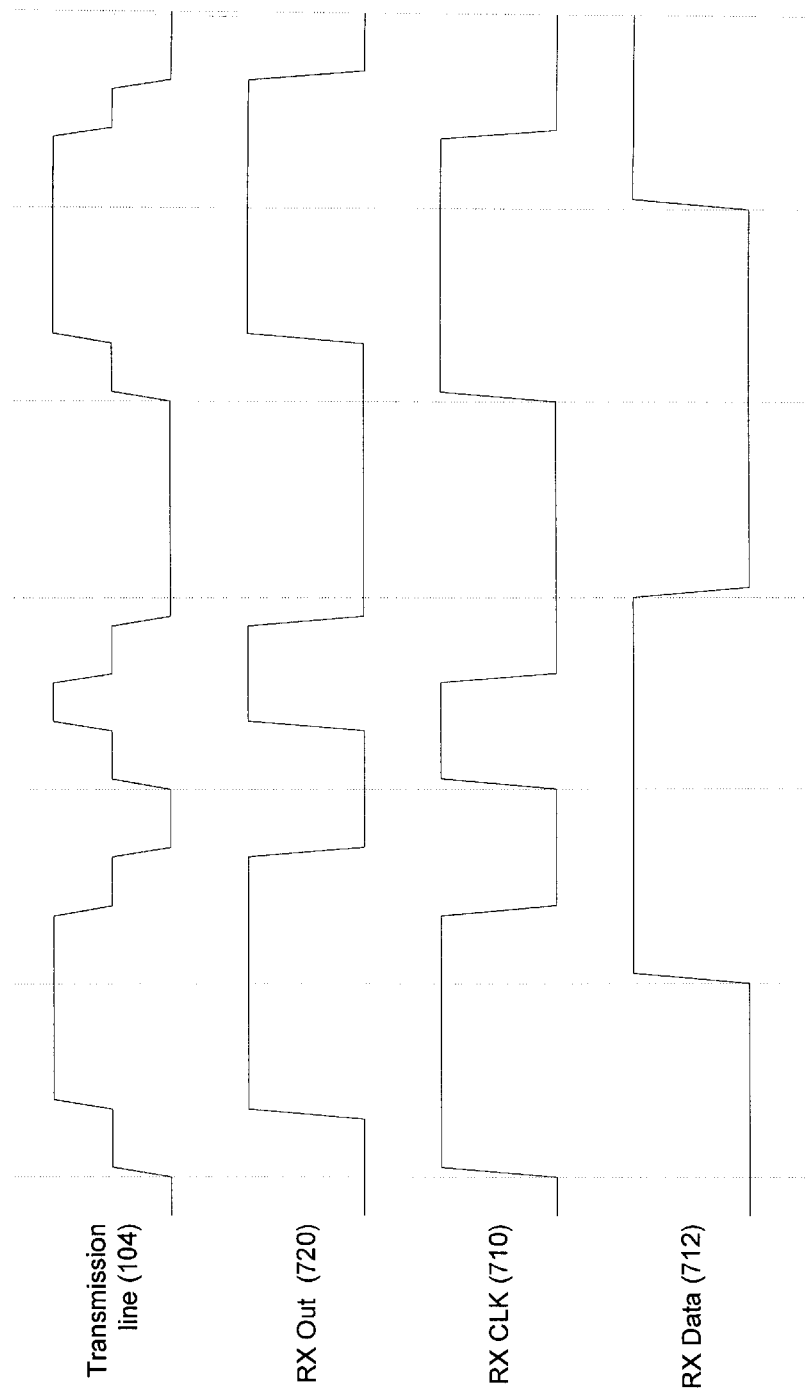
FIG. 11B is a timing diagram illustrating signals on the transmission line, the data signal sent by the receiver, and the clock and data signals recovered by the receiver for return to zero signaling.
Figure 12A:
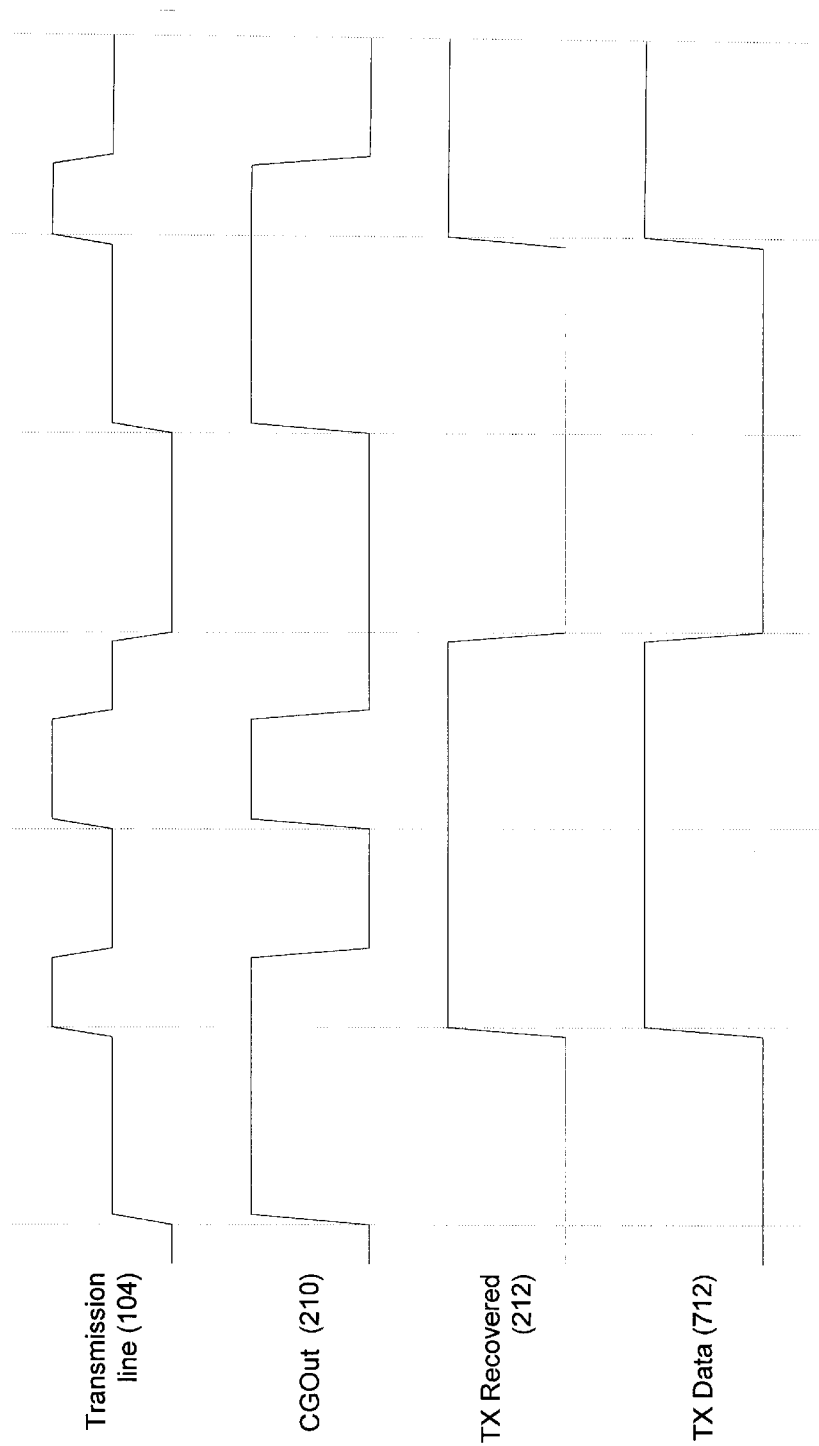
FIG. 12A is a timing diagram illustrating signals on the transmission line, and the clock and data signals generated by the transmitter for non-return to zero signaling.
Figure 12B:
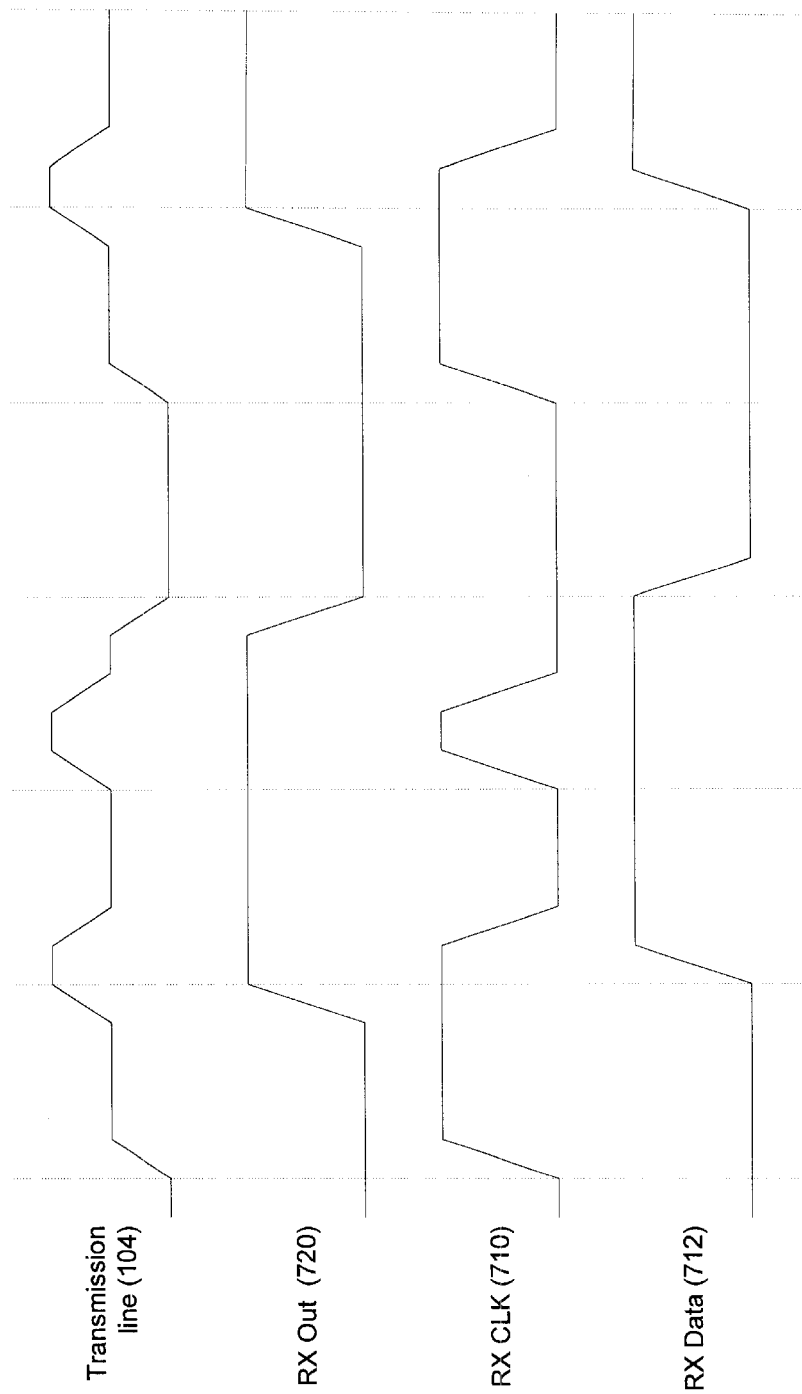
FIG. 12B is a timing diagram illustrating signals on the transmission line, the data signal sent by the receiver, and the clock and data signals recovered by the receiver for non-return to zero signaling.

Referring now to FIGS. 11A, 11B, 12A, and 12B, timing diagrams for the key signals of the present invention are shown. The timing diagram includes: 1) the CGOut signal on line 210 which is asserted on the clock transmission line 104; 2) the signal on the clock transmission line 104; 3) the re-generated clock signal on line 710; 4) the recovered data signal on line 712; and 5) the return channel signal asserted by the return channel encoder 704 on the clock transmission line 104. FIG. 11A illustrates the signals at the transmitter 102 using a return to zero signaling method. Similarly, FIG. 11B illustrates signals on the transmission line, and signal in the receiver 106 using a return to zero signaling method. In contrast, FIGS. 12A and 12B show the signal relationships for a non-return to zero signaling method. FIG. 12A shows the signals at the, transmitter 102 and FIG. 12B shows the signals at the receiver 106.

These timing diagrams demonstrate a number of features of the combined clock and bi-directional data link of the present invention. First, that transition activity and polarity activity by either the transmitter 102 or the receiver 106 is minimized or eliminated close to the rising edge of the CGOut signal. Second, the transmission of data from the transmitter 102 to the receiver 106 is through the position of the falling edge of the clock signal. Third, the transmission of data from the receiver 106 to the transmitter 102 is by current or voltage level adjustment and any changes are not made near the rising edge of the clock signal from the transmitter 102. Fourth, the effect of assertion of data signals by the receiver 106 does not impact the edges in the signals from the transmitter 102.

Clock Multiplication

One important advantage of the present invention is that no modification to any portions of the present invention is necessary for the invention to be operable with or without clock multiplication. In some cases, the transmitter 102 and the receiver 106 have the ability to increase the data transmission rate by increasing the clock rate through clock multiplication (sending multiple clock signals within one period of the clock signal). In such a case, the transmitter 102 asks the receiver 106 if it can handle clock multiplication. The receiver 106 indicates to the transmitter 102 what if any levels of clock multiplication can be handled. The transmitter then sends on the highest clock multiplication level possible. In clock multiplication, the transmitter 106 just sends a multiplied clock, however, the receiver 106 has to divide that multiplied clock down to the original pixel clock so that the main data channel can make use of the clock. The phase information on the clock is also important in some data links and it can also be conveyed through the data link provided with the present invention. In the transmitter 102, a DLL/PLL is used to multiply the clock at the integer multiple of the incoming clock. For some transmission lines, since the jitter information is important, only integer multiple is allowed. However, if this is not that important, rational number multiples can also be used to save the bandwidth.

It is to be understood that the specific mechanisms and techniques that have been described are merely illustrative of one application of the principles of the invention. Numerous additional modifications may be made to the apparatus described above without departing from the true spirit of the invention.

What is claimed is:

1. An apparatus for transmitting a clock signal and data signals over a signal line, the apparatus comprising a clock generator having a first input, a second input and an output, the clock generator modulating a falling edge of an output signal to indicate different data values, the first input of the clock generator coupled to receive a clock signal, and the second input of the clock generator coupled to receive a control signal indicating a data value to be transmitted.

2. The apparatus of claim 1, further comprising a data decoder for extracting data signals, the data decoder having an input and an output, the data decoder for extracting data signals, the input of the data decoder coupled to the signal line, the output providing data from the signal line.

3. The apparatus of claim 2, further comprising a line interface for asserting signals on and extracting signals from the signal line, the line interface having an input, an output and a bi-directional port, the bi-directional port coupled to the signal line, the input of the line interface coupled to the output of the clock generator, the output of the line interface coupled to the input of the decoder.

4. The apparatus of claim 3, wherein the line interface further comprises a first amplifier coupling the output of the clock generator to the signal line, a differential amplifier having a first input coupled to the signal line, a second amplifier coupling the clock generator to a second input of the differential amplifier, and the output of the differential amplifier providing the output of the line interface.

5. The apparatus of claim 1, wherein the clock generator further comprises:
 a delay-locked loop having an input and a plurality of outputs for outputting signals shifted in phase from an input signal, the input of the delay-locked loop coupled to receive the clock signal;
 a multiplexer having a plurality of inputs and an output for selecting one of the plurality of input signals for output, the plurality of inputs of the multiplexer coupled to respective outputs of the delay-locked loop; and
 a latch having a first input and a second input, the first input coupled to an output of the delay-locked loop, and the second input coupled to output of the multiplexer.

6. The apparatus of claim 5, further comprising a monostable multivibrator having an input and an output, the input of the monostable multivibrator adapted to receive the clock signal, the output of the monostable multivibrator coupled to the input of the delay locked loop.

7. The apparatus of claim 5, wherein the latch further comprises a pair of cross-coupled NAND gates.

8. The apparatus of claim 2, wherein the decoder further comprises
 a delay-locked loop having an input and a plurality of outputs for outputting signals shifted in phase from an input signal, the input of the delay-locked loop coupled to receive the clock signal;
 a sampling unit having a plurality of inputs, a first output and a second output, the sampling unit for controlling when signals are sampled and for indicating the time at which signals are sampled, the plurality of inputs coupled to respective outputs of the delay-locked loop;
 a transition detector for determining when there is a transition in a signal, the transition detector having a data input, a control input and a data output, the data input of the transition detector coupled to the signal line, the control input of the transition detector coupled to the first output of the sampling unit; and
 a data generator having a first input, a second input and an output, data generator for producing bit values corresponding to when transitions occur on the signal line, the first input of the data generator coupled to the second output of the sampling unit, the second input of the data generator coupled to the output of the transition detector.

9. The apparatus of claim 2, wherein the decoder further comprises
 a delay-locked loop having an input and a plurality of outputs for outputting signals shifted in phase from an input signal, the input of the delay-locked loop coupled to receive the clock signal;
 a flip-flop having an control input, a data input and an output, the control input of flip-flop coupled to one of the plurality of outputs of the delay-locked loop, and the data input of the flip-flop coupled to the signal line.

10. The apparatus of claim 1, wherein the apparatus is coupled by the signal line to a receiver, and wherein the receiver further comprises:
 a clock re-generator having an input and an output for recovering a clock signal from the signal line, the input of the clock re-generator coupled to the signal line;
 a second decoder for extracting data signals, the second decoder having a first input, a second input and an output, the second decoder for extracting data signals, the first input of the second decoder coupled to the signal line, the second input of the second decoder coupled to the output of the clock re-generator and the output providing data from the signal line.

11. The apparatus of claim 10, wherein the clock re-generator of the receiver is an amplifier.

12. The apparatus of claim 10, wherein the clock re-generator of the receiver is a phase-locked loop.

13. The apparatus of claim 10, wherein the second decoder further comprises
 a delay-locked loop having an input and a plurality of outputs for outputting signals shifted in phase from an input signal, the input of the delay-locked loop coupled to output of the clock re-generator;
 a sampling unit having a plurality of inputs, a first output and a second output, the sampling unit for controlling when signals are sampled and for indicating the time at which signals are sampled, the plurality of inputs coupled to respective outputs of the delay-locked loop;
 a transition detector for determining when there is a transition in a signal, the transition detector having a data input, a control input and a data output, the data input of the transition detector coupled to the signal line, the control input of the transition detector coupled to the first output of the sampling unit; and
 a data generator having a first input, a second input and an output, data generator for producing bit values corresponding to when transitions occur on the signal line, the first input of the data generator coupled to the second output of the sampling unit, the second input of the data generator coupled to the output of the transition detector.

14. The apparatus of claim 10, wherein the second decoder further comprises
 a delay-locked loop having an input and a plurality of outputs for outputting signals shifted in phase from an input signal, the input of the delay-locked loop coupled to the output of the clock re-generator; and
 a flip-flop having a control input, a data input and an output, the control input of flip-flop coupled to one of the plurality of outputs of the delay-locked loop, and the data input of the flip-flop coupled to the signal line.

15. The apparatus of claim 10, further comprising a second line interface for asserting signals on and extracting signals from the signal line, the second line interface having an input, an output and a bi-directional port, the bi-directional port coupled to the signal line, the output of the line interface coupled to the input of the second decoder and the clock re-generator.

16. The apparatus of claim 10, further comprising a delay compensator having an input and an output for adjusting a recovered clock signal to compensate. for propagation delay, the input of the delay compensator coupled to the output of the clock re-generator.

17. The apparatus of claim 16, further comprising a return channel encoder having a first input, a second input and an output, for sending signals on the signal line, the first input of the return channel encoder coupled to receive data for transmission, the second input of the return channel encoder coupled to the output of the delay compensator, and the output of the return channel encoder coupled to the signal line.

18. The apparatus of claim 17, wherein the return channel encoder further comprises:
a delay-locked loop having an input and a plurality of outputs for outputting signals shifted in phase from an input signal, the input of the delay-locked loop coupled to the output of the delay compensator; and
a flip-flop having an control input, a data input and an output, the control input of flip-flop coupled to one of the plurality of outputs of the delay-locked loop, and the data input of the flip-flop coupled to the signal line.

19. A receiver for coupling to a transmitter through a signal line, wherein the receiver comprises:
a clock re-generator for recovering a clock signal from the signal line, the clock re-generator having an input and an output, the input of the clock re-generator coupled to the signal line; and
a data decoder for extracting data signals from the clock signal, the decoder having a first input, a second input, and an output, the first input of the decoder coupled to the signal line, the second input of the second decoder coupled to the output of the clock re-generator and the output providing data from the signal line, the data decoder comprising:
a delay-locked loop having an input and a plurality of outputs for outputting signals shifted in phase from an input signal, the input of the delay-locked loop coupled to the output of the clock re-generator; and
a flip-flop having a control input, a data input, and an output, the control input of the flip-flop coupled to one of the plurality of outputs of the delay-locked loop, the data input of the flip-flop coupled to the signal line, and the output providing data from the signal line.

20. The receiver of claim 19, further comprising a line interface for asserting signals on and extracting signals from the signal line, the line interface having an input, an output and a bi-directional port, the bi-directional port coupled to the signal line, the output of the line interface coupled to the input of the decoder and the clock re-generator.

21. The receiver of claim 20, further comprising a delay compensator having an input and an output for adjusting a recovered clock signal to compensate for propagation delay, the input of the delay compensator coupled to the output of the clock re-generator.

22. The receiver of claim 21, further comprising a return channel encoder having a first input, a second input and an output, for sending signals on the signal line, the first input of the return channel encoder coupled to receive data for transmission, the second input of the return channel encoder coupled to the output of the delay compensator, and the output of the return channel encoder coupled to the signal line.

23. The receiver of claim 22, wherein the return channel encoder further comprises:
a rising edge detector having an input and an output, the input coupled to the output of the delay compensator;
a delay circuit having an input and an output, the input coupled to the output of the rising edge detector; and
a latch having a control input, a data input and a data output, the control input coupled to the output of the delay circuit, the data input adapted to receive data, and the data output coupled to the input of the line interface.

24. The receiver of claim 22, wherein the return channel encoder further comprises:
a delay-locked loop having an input and a plurality of outputs for outputting signals shifted in phase from an input signal, the input of the delay-locked loop coupled to the output of the delay compensator; and
a flip-flop having a control input, a data input and an output, the control input of the flip-flop coupled to one of the plurality of outputs of the delay-locked loop, and the data input of the flip-flop coupled to the signal line.

25. A method for receiving and transmitting signals using a receiver coupled to a signal line, the method comprising:
receiving a signal on an input of a clock re-generator, the clock re-generator having an input and an output, the clock re-generator being adapted for recovering a clock signal from the signal line;
receiving a signal on a data input of a data decoder, the data decoder having a control input, a data input, and a data output, the data decoder adapted for extracting data from the signal on the data input;
passing the clock signal from the output of the clock re-generator to the control input of the data decoder;
passing the clock signal from the output of the clock re-generator to the input of a delay compensator, the delay compensator having an input and an output, the delay compensator adapted for adjusting a clock signal from a clock re-generator to compensate for propagation delay; and
transmitting data from a data output of a return channel encoder over the signal line, the return channel encoder having a control input, a data input, and a data output, the control input coupled to receive the output from the delay compensator and the data input being adapted to receive data.

26. The method of claim 25, wherein prior to receiving a signal on an input of a clock re-generator, the method further comprises:
receiving a signal on an input of a line interface, the line interface having an input coupled to the signal line and an output.

* * * * *